July 8, 1958 G. E. FRANCK 2,842,381
VALVED CONNECTOR
Filed Feb. 7, 1955

INVENTOR.
George E. Franck,
BY
Attys.

United States Patent Office 2,842,381
Patented July 8, 1958

2,842,381
VALVED CONNECTOR

George E. Franck, Riverside, Ill., assignor to The Imperial Brass Manufacturing Company, a corporation of Illinois Application February 7, 1955, Serial No. 486,347

2 Claims. (Cl. 284—18)

This invention relates to a valved connector and, in particular, to a connector arranged to allow quick connection of a device to a supply tube from a source of pressurized fluid with minimum fluid loss during the connection, and having means to automatically prevent discharge from the connector when the device is disconnected.

Where a common manifold or other source of fluid under pressure, through a plurality of supply lines, furnishes fluid to a plurality of devices such as meters, it is often desirable to allow connection of any one of the supply lines to one of the devices for a short period of time without appreciably affecting the pressure of the fluid in the manifold and without the loss of any appreciable amount of fluid during connection or disconnection of the selected device. To this end, it is desirable that automatic valve means be incorporated in the connector to minimize the manual operations necessary for making the connection; such means, however, must be positive acting to preclude fluid loss when the device is disconnected while being readily positionable into a fluid transmitting arrangement. To retain the connector valve in this latter arrangement, it is desirable that simple and effective combined securing and sealing means be provided to attach the device to the connector in operative association with the valve.

The principal object of this invention, therefore, is to provide a new and improved valved connector adapted for the quick attachment of a supply tube to a device.

Another object is to provide a valved connector having improved automatic flow control means arranged positively to prevent fluid discharge when no element is connected thereto.

A further object of the invention is to provide such flow control means which is further adapted automatically to allow communication between the supply tube and an inlet port of the device when the device is attached to the connector.

Still another object of the invention is to provide a valved connector having means for providing a first seal between the device and the connector before the connector valve is opened and a second seal when the valve is opened and the device is secured to the connector.

Other features and advantages of this invention will be apparent from the following description taken in connection with the accompanying drawings wherein.

Figure 1:
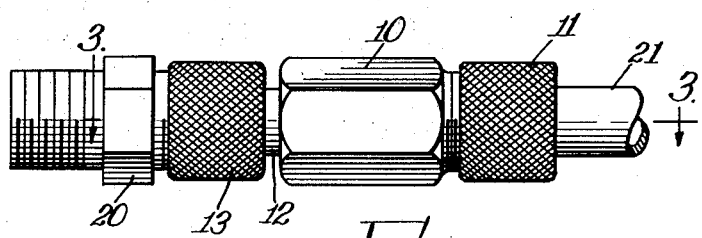
Fig. 1 is a side elevational view of a connector embodying the invention, with the end of a supply tube and a device secured thereto.

Referring now to the drawings, and, in particular, to Fig. 1, one embodiment of the invention may be seen wherein the connector comprises generally a body member 10 having one end adapted to be more or less permanently secured to a supply tube 21 leading from a tank or other source of pressurized fluid (not shown) and another end adapted to receive for quick connection or disconnection a tubular projection 20a of a device 20 to be supplied with the pressurized fluid. Housed within the body member is a valve means generally designated 14 biased to closed position and moved to open position as an incident to attaching the device 20 to the connector. Carried by the body member 10 at the end receiving the supply tube 21 is means generally designated 11 functioning in cooperation with the body member to sealingly secure the tube end to the body member. At the other end of the body member is mounted a projecting tubular sleeve 12 adapted to secure the device projection 20a, with means generally designated 13 carried thereon for functioning in cooperation therewith to affect a fluid-tight seal between the device and the sleeve and also to retain the device in such physical relationship relative to the sleeve and body as to cause it to hold the valve in the open position.

Figure 2:
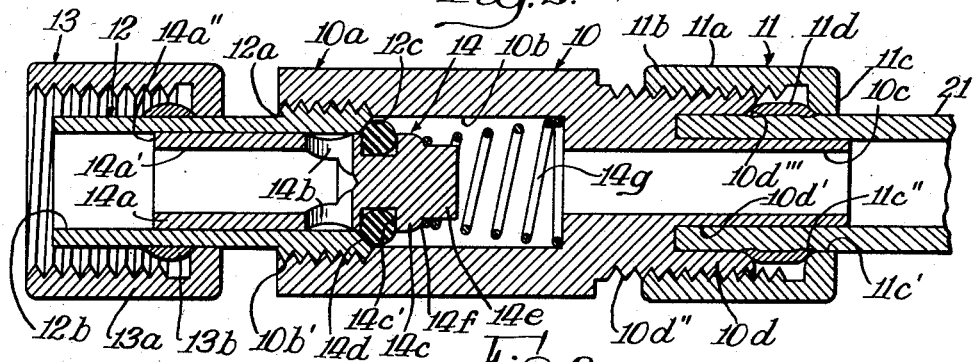
Fig. 2 is a diametrical sectional view of the connector with the valve in the normally closed position, and with a supply tube attached thereto.

Referring now more particularly to Fig. 2, body member 10 comprises a generally tubular member having a first end 10a provided with an axially-disposed recess 10b. The outer end 10b' of the recess is threaded to allow attachment of sleeve 12 to the body member. Extending longitudinally from the inner end of the recess is an axially-disposed bore 10c opening through body member second end 10d and forming together with recess 10b a passage through the body member. For receiving the end of the tubing 21, an annular groove 10d' is provided in end 10b and extending concentrically of bore 10c. The exterior periphery 10d'' of end 10d is threaded for cooperation with tube securing means 11.

The tube securing means 11 comprises a cup-shaped nut 11a having a longitudinal, internally-threaded portion 11b and a radially, inwardly-extending flanged end 11c with a central opening 11c' adapted to allow the insertion of the tubing 21 therethrough with minimum clearance.

An annular sealing gasket 11d is provided for mounting on the tube 21 in the resultant annular space between the body member end 10d, the tube 21, and the nut 11a. When the nut is threadably advanced on threaded end 10d'', the gasket is compressed into tight sealing engagement with the body member, tube and nut. To increase the radially inward constriction of the gasket, body member end 10d is provided with a rounded inwardly-flared edge 10d''' and nut end 11c is provided with a similar rounded, inwardly-flared edge 11c''. To allow repetitive installations of the connector, it is preferable that gasket 11d be formed of a resilient material precluding permanent deformation although suitable gasket material providing a satisfactory fluid seal may be used.

Tubular sleeve 12 is externally threaded at its inner end 12a and is secured to the threaded recess end 10b' so as to extend axially outwardly from recess 10b. Extending longitudinally completely through the sleeve is bore 12b; the inner end 12c of sleeve into which the bore opens extends generally laterally to the axis of the bore and is flared to form a seat for the valve 14. The sleeve bore diameter is made sufficiently less than the diameter of recess 10b so that valve seat 12c provides adequate seating area.

Mounted in the sleeve bore and extending inwardly into recess 10b is valve 14 which is provided with a tubular stem 14a slidably carried in the sleeve and through which extends a longitudinal bore 14a'. Communicating with the inner end of bore 14a' are a plurality of radially-extending passages 14b; with the valve in the closed position, as seen in Fig. 2, passages 14b are covered by the sleeve 12 precluding communication with the recess 10b. At the inner end of the valve is provided a valve head 14c. To assure a sealing closure of the recess, valve head 14c is provided with an annular peripheral groove 14c' in which is mounted an O-ring 14d having sealing engagement with the valve and removable seating engagement with sleeve seat 12c. The diameter of inner end 14e of the valve head is made somewhat smaller than the remainder, thereby forming a shoulder 14f. Although the pressure of the fluid in the supply tube 21 is generally sufficient to cause the valve to move outwardly (to the left as seen in Fig. 2) and the O-ring to have tight seating engagement with the sleeve seat, it is desirable to bias the valve slightly into this position and for this purpose a helical compression spring 14g is mounted in recess 10b with one end abutting shoulder 14f and the end abutting the body member wall at the inner end of the recess.

Figure 3:
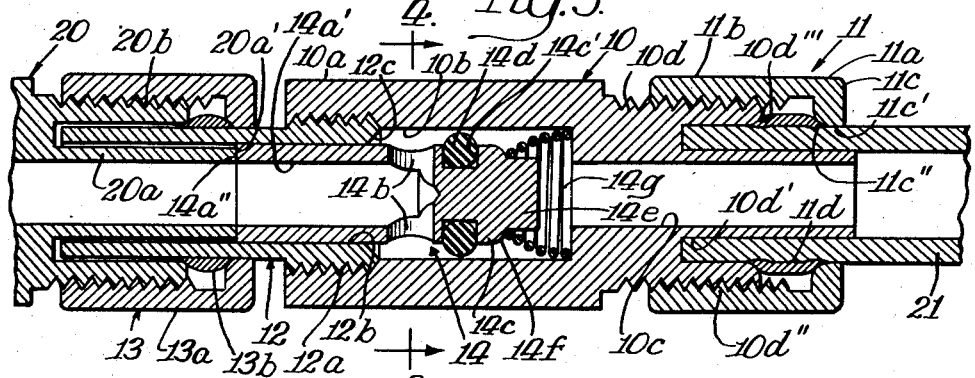
Fig. 3 is a sectional view taken approximately along the line 3—3 of Fig. 1 with the valve actuated open; and, Fig. 4 is a sectional view taken approximately along the line 4—4 of Fig. 3.
Figure 4:
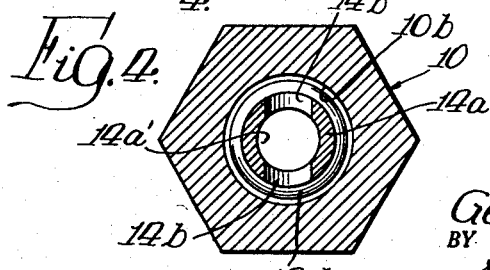

In Fig. 3 may be seen the positioning assumed by the valve when a device 20 is secured to the connector. The diameter of sleeve bore 12b is made such as to readily receive a tubular projection 20a of device 20. Projection 20a is inserted into bore 12b so that its outer end 20a' abuts end 14a'' of valve stem 14a. Further inward movement of the projection causes valve 14 to slide in sleeve bore 12b inwardly against the action of the spring 14g and the pressure of fluid admitted to recess 10b from tubing 21 until radial passages 14b are in communication with the recess. This results in connection of the fluid supply with the device, communication therebetween being maintained as long as the projection 20a is retained in this fully inserted position.

When the initial abutment of projection end 20a' and valve end 14a'' is had, a seal is effected therebetween. This seal is maintained by the forcing of the projecting end against the valve end to fully insert the projection and cause the valve 14 to open and effectively minimize fluid loss during the attachment of the device to the connector.

To secure the device to the connector in the fully inserted position, securing means 13 are provided having a nut 13a of similar construction to that of nut 11a and adapted to be secured to a threaded portion 20b of the device 20. A gasket 13b, similar to gasket 11d, is provided to effectuate a second seal between the device 20 and the sleeve. Gasket 13b is mounted on sleeve 12 and within nut 13a so that advancement of nut 13a on the threaded projection 20b of device 20 causes the gasket to be tightly pressed by the nut against the projection 20b and the sleeve 12 to form a seal therebetween. The frictional engagement had by the gasket and the sleeve 12 further acts to physically retain the device positionally and thus maintain the valve 14 in the open position. As the connection to the element is generally intended to be repetitively made, the use of a non-permanently-deforming material for the gasket is preferred.

The utilization of my connector is as follows. The end of supply tube 21 having been inserted into the body member groove 10d' with the nut 11a and gasket 11d previously loosely mounted on the tube, fixed sealing attachment thereof is effected by threading the nut onto the threaded end 10d'' of the body member, thereby compressing the gasket into sealing engagement with the body member and the tube and retaining the tube in the groove by the frictional force between the gasket and the tube. Valve 14 will assume the position shown in Fig. 2 by virtue of spring 14g urging the valve outwardly. When fluid under pressure is admitted from supply tube 21 through bore 10c and into recess 10b, the action thereof will be to force the O-ring 14d of valve 14 more tightly against the seat 12c preventing flow through the connector.

A device 20 may be connected to the connector by inserting the device projection 20a into the bore 12b of the sleeve 12 until projection end 20a' abuts valve stem 14a'' whereby a first seal is effected, and continue the inward movement until the radial passages 14b are allowed to communicate with the recess 10b. Spring 14g readily allows such movement and only a small force is necessary normally to retain the valve in the fully open position.

Sealed communication is now had between the source of fluid and the device through the connector. To maintain this communication, it is merely necessary to threadedly advance nut 13a on threaded portion 20b of the device until the gasket 13b is compressed between the nut 13a, device 20, and sleeve 12 resulting in a seal between the sleeve and element and a frictional gripping action maintaining the position.

To remove the device 20, nut 13a is reverse threaded until resilient gasket 13b assumes a loose mounting on the sleeve. The device may then be withdrawn from the connector, thereby allowing valve 14 to return to the position shown in Fig. 2 under the forcible urging of spring 14g and the fluid pressure, with the O-ring, again seating against sleeve seat 12c, automatically preventing loss of the pressurized fluid.

While I have shown and described certain embodiments of my invention, it is to be understood that it is capable of many modifications. Changes, therefore in the construction and arrangement may be made without departing from the spirit and scope of the invention as defined in the appended claims.

I claim:

1. A valved connector for ready attachment of a fluid pressure supply line to a device having a tubular connection projection, comprising: a body member having a passage completely therethrough; means for connecting the end of a supply tube to one end of the body member in fluid conductive relationship; a tubular sleeve secured to the body member within the passage and having an end projecting outwardly from the opposite end of the body member and an inner end forming a valve seat; a valve within the body member passage having a tubular stem slidable in the sleeve and having a laterally extending passage through the wall thereof and an outer end, said valve further having a sealing member adapted to abut the valve seat to close the passage, and yielding means urging the valve into seated position; a single yieldable, annular member concentrically mounted around said outer end of the sleeve; and a connecting member adapted to be secured to a device and urge said annular member forcibly against said sleeve and the device to seal and secure said device to said connector and retain positionally a tubular connection projection of the device inserted into said sleeve against said valve stem end to hold the valve open against the action of the yielding means.

2. A valved connector for ready attachment of a fluid pressure supply line to a device having a tubular connection projection, comprising: an elongated body member having a recess at one end and a bore extending from the recess and opening into the other end; means for securing the end of a supply tube to the body member to have sealed communication with the bore; a tubular sleeve provided with an inner end in the body member defining a valve seat, said sleeve being provided with a bore communicating with the recess and having an outer portion projecting from said body member; a valve member having a tubular stem slidably carried within the sleeve bore and an inner end in removable engagement with the valve seat to close the sleeve bore; biasing means engaging said body member and said valve to bias the valve member end into engagement with the valve seat; and unitary means for sealing and securing the device to said sleeve portion with the device projection inserted into said sleeve bore to abut said stem and overcome the biasing means and open the valve, comprising a single yieldable ring carried around said sleeve portion and a connecting member adapted to be secured to the device and being arranged to urge forcibly said ring against the device and said sleeve portion thereby to fix the ring on said sleeve portion and cause the ring to engage sealingly the sleeve portion and the device.

References Cited in the file of this patent

UNITED STATES PATENTS

| | | |
|---|---|---|
| 418,225 | Rice | Dec. 31, 1889 |
| 1,190,860 | Claflin | July 11, 1916 |
| 1,289,714 | Elkin | Dec. 31, 1918 |
| 2,138,940 | Robinson | Dec. 6, 1938 |
| 2,373,886 | Geiger | Apr. 17, 1945 |
| 2,459,477 | Van Schuyver | Jan. 18, 1949 |

FOREIGN PATENTS

| | | |
|---|---|---|
| 1,863 | Great Britain | Jan. 24, 1906 |
| 708,613 | Great Britain | May 5, 1954 |